（12）United States Patent
Beard

(10) Patent No.: US 6,292,437 B1
(45) Date of Patent: Sep. 18, 2001

(54) PORTABLE IDENTIFICATION CAPTURE SYSTEM FOR TRANSACTION VERIFICATION

(75) Inventor: Paul Beard, Milpitas, CA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 08/987,831

(22) Filed: Dec. 9, 1997

Related U.S. Application Data

(60) Provisional application No. 60/032,911, filed on Dec. 16, 1996.

(51) Int. Cl.[7] .................................................. G10K 11/00
(52) U.S. Cl. ........................................... 367/197; 704/246
(58) Field of Search ........................... 235/380; 380/23, 380/25, 4; 322/119; 379/10, 191.01; 382/115; 705/3; 340/825.69, 825.72, 825.31, 825.34; 367/167; 704/273, 246

(56) References Cited

U.S. PATENT DOCUMENTS

| | | | |
|---|---|---|---|
| 3,896,266 | * | 7/1975 | Waterbury .............................. 380/23 |
| 5,040,212 | * | 8/1991 | Bethards .............................. 704/246 |
| 5,247,580 | * | 9/1993 | Kimura et al. .......................... 379/29 |
| 5,357,563 | * | 10/1994 | Hamilton et al. .................. 379/91.01 |
| 5,499,288 | * | 3/1996 | Hunt et al. ............................ 704/246 |
| 5,504,677 | * | 4/1996 | Pollin .................................... 364/408 |
| 5,546,462 | * | 8/1996 | Indeck et al. .......................... 380/23 |
| 5,559,895 | * | 9/1996 | Lee et al. .............................. 382/119 |
| 5,561,282 | * | 10/1996 | Price et al. ............................ 235/380 |
| 5,714,741 | * | 2/1998 | Pieterse et al. ....................... 235/380 |
| 5,953,700 | * | 9/1999 | Kanevsky et al. .................... 704/273 |

* cited by examiner

Primary Examiner—Peguy JeanPierre
Assistant Examiner—Jean Bruner Jeanglaude
(74) Attorney, Agent, or Firm—Suiter & Associates, PC

(57) ABSTRACT

A method and apparatus for transaction verification is provided. An acoustic signature of a transaction executioner is captured and electronically saved as a digital signature file. The digital signature file is associated with the transaction and then sent to a central location for storage. The transaction may be verified by reproducing the acoustic signature file from the digital signature file and acoustically verified by parties interested in verifying the transaction.

19 Claims, 5 Drawing Sheets

PORTABLE IDENTIFICATION CAPTURE SYSTEM FOR TRANSACTION VERIFICATION

RELATED APPLICATION

The present application claims priority under 35 U.S.C. § 119(e) based on U.S. provisional application Ser. No. 60/032,911, filed Dec. 16, 1996.

BACKGROUND OF THE INVENTION

The present invention generally relates to the field of identification capture systems, and more particularly to a hand-held portable automatic identification capture system.

There are many applications in which it is desirable to be able to automatically capture identification information to be stored and later retrieved for identification and transaction verification purposes. For example, in route delivery applications, it is desirable to automatically capture information for verifying the delivery of a package or parcel. The identification information should be rapidly and automatically captured and easily retrieved for later transaction verification purposes.

SUMMARY OF THE INVENTION

Accordingly, it is a goal of this invention to provide a method and apparatus for automatically capturing identification information.

More specifically, a method for verifying the execution of a transaction comprises the steps of capturing an acoustic signature of a transaction executioner concurrent with the execution of the transaction, converting the acoustic signature into a digital signature file capable of being digitally processed and stored, associating the digital signature file with the executed transaction, transferring the digital signature file to a remote location for storage, and verifying the execution of the transaction by reproducing the acoustic signature of the executioner thereof from the digital signature file.

In addition, an apparatus for verifying a transaction comprises a hand-held portable data terminal for collecting and processing information relating to the transaction, an electroacoustic transducer disposed on the hand-held portable data terminal for converting an acoustic signal into an electrical signal output, an analog to digital converter connected to the electroacoustic transducer for converting the electrical signal output of the electroacoustic transducer into a digital signal, and a central processing unit connected to the analog to digital converter for processing the digital signals.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiment of the invention, an example of which is illustrated in the accompanying drawings.

Figure 1:
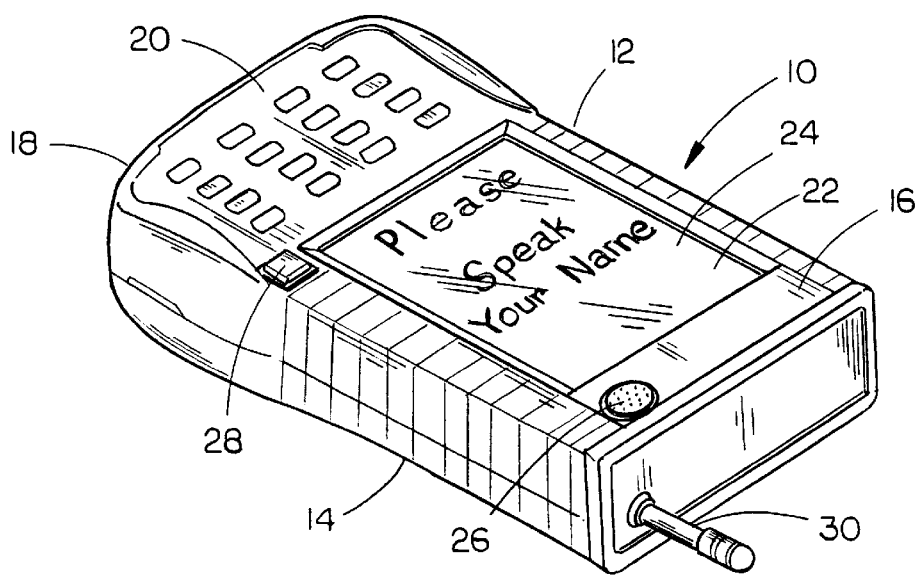
FIG. 1 is an illustration of a hand-held portable data terminal which may utilized with portable identification capture system of the present invention.

Referring now to FIG. 1, a hand-held portable data terminal in accordance with the present invention is shown. The data terminal 10 may be a hand-held, battery powered, portable computer for data collection and processing applications. The data terminal 10 generally comprises an upper surface 12, a lower surface 14, a top end 16 and a bottom end 18. A keypad 20 comprising a plurality of keys may be disposed on the upper surface 12 at the bottom end 18 for manual entry of data. The data terminal 10 may further include a display 22 for displaying information thereon. The display 22 may also include a touch screen overlay for tactile touch or stylus data entry. The portable data terminal of FIG. 1 may be obtained from NORAND Corporation of Cedar Rapids, Iowa, for example the NORAND PEN*KEY 6100 Hand-Held Computer.

The data terminal 10 additionally includes an electroacoustic transducer 26 for converting acoustic signals into electrical signals and thereby act as a microphone. The electroacoustic transducer 26 may also be used convert electrical signals into acoustic signals and thereby act as a speaker. The electroacoustic transducer 26 may be a piezoelectric or ceramic type transducer or may be a dynamic type transducer utilizing magnetic fields and mechanical movements to create alternating currents. The data terminal 10 also includes an acoustic signal capture actuator 28 which may be used to initiate and terminate the capturing of an acoustic signature in accordance with the present invention. The acoustic signal capture actuator may be a separate, dedicated actuator as shown in FIG. 1 or alternatively, may be one or more keys of the keypad programmed to perform the acoustic identification signature actuation functions. The data terminal 10 may contain an internal radio connected to antenna 30 for RF data communications over a local area network (LAN) or a wide area network (WAN).

Figure 2:
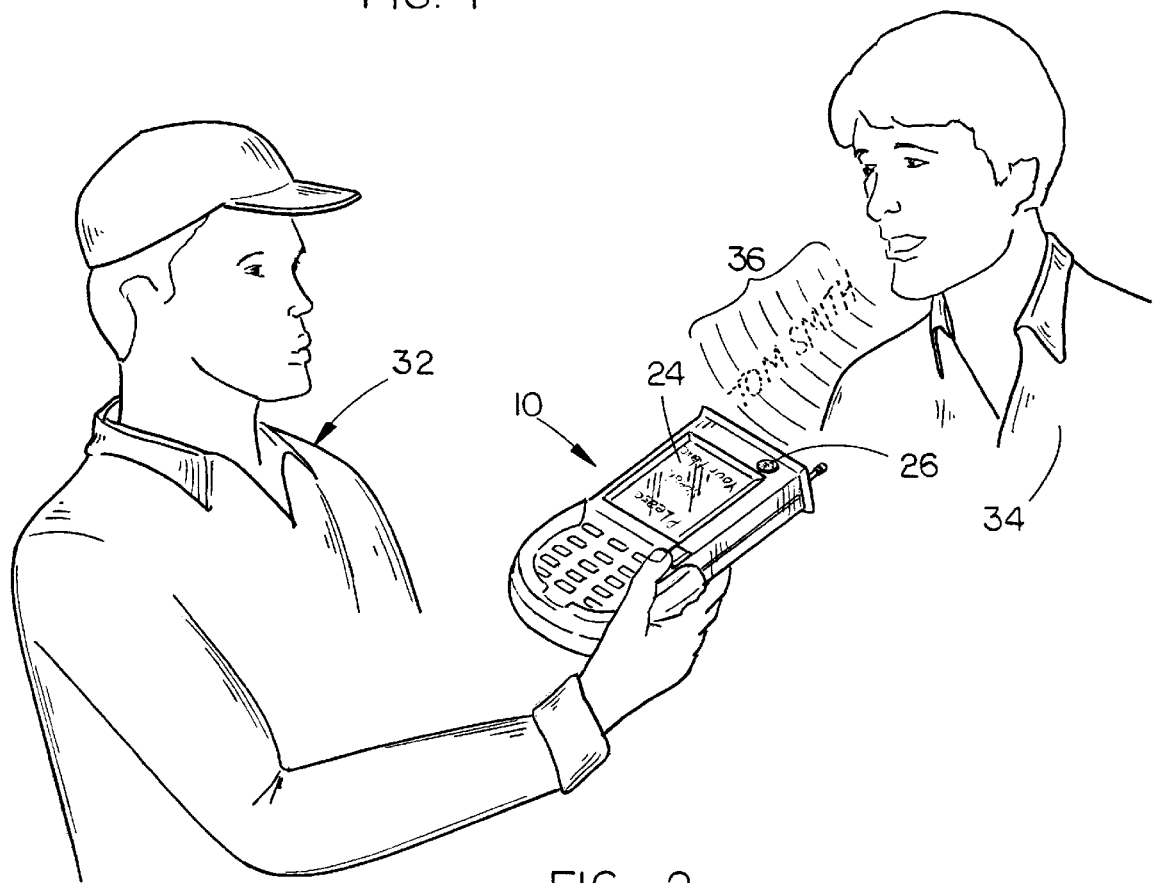
FIG. 2 is an illustration of the hand-held portable data terminal of FIG. 1 capturing an acoustic identification signature for transaction verification in accordance with the present invention.

Referring now to FIG. 2, the capturing of an acoustical identification signature is shown. A route delivery driver of other similar type agent 32 may utilize the data terminal 10 to log and track transactions which he or she is responsible to perform. For example, the agent 32 may deliver a parcel to an end point destination which requires in the ordinary course of business verification that the parcel was left with a responsible individual 34 who executes or completes the delivery transaction. Typically, the agent 32 requests the transaction executioner 34 to sign a document for later verification that the transaction had been executed. However, handwritten paper signatures are often difficult to verify and must later be manually entered into a computer system for record compilation, a tedious and labor intensive task. With a touch screen 24, a stylus may be utilized to capture an electronic signature of the transaction executioner 34. However, electronic signatures still suffer from legibility problems. Further, handwritten and electronic signatures are difficult if not impossible to verify over telephone lines with standard voice communication.

As shown in FIG. 2, the hand-held data terminal 10 of the present invention may capture an acoustic signature 36 of the transaction executioner 34 to be saved in electronic memory. The acoustic signature 36 may be saved in an audio data file format, including but not limited to 16-bit PCM, G.711 mu-law, AIFF, XSNG, MPEG, IMA/DVI ADPCM, GSM 06.10, InterWave VSC112, TrueSpeech 8.5, RealAudio, and waveform audio (WAV) formats, which are well known audio formats.

The memory occupied by stored digitized acoustic signatures will depend primarily on the sampling rate and the compression ratio utilized. The desired frequency bandwidth to be digitized will likewise affect the memory requirements, however, sampling rate will effectively provide an upper frequency limit of about one half the sampling rate in order to avoid aliasing. For acoustic signature capture purposes, a mono audio signal having an 8 kHz bandwidth may be utilized to capture a sufficient amount of audio information while minimizing the size of the audio data file for a given sampling rate. Further, audio compression techniques may be utilized to reduce the size of the audio data file for storage space conservation. An eight-to-one (8:1) compression ratio may be utilized, but other compression ratios may similarly be utilized with success, depending upon the format of the data file and the compression algorithm used. Although the compression and decompression process may cause a loss or change in some subtle details of the waveforms, substantial savings in memory can be realized, and the sound will generally be of a higher quality than it would if the same memory savings were to be achieved via a reduction in the sampling rate.

A typical sampling rate may result in data file sizes of 16 kilobytes of information per second of recorded sound. Generally the storage space in kilobytes will be equal to the sampling rate in kHz multiplied by the number of seconds of sound divided by the compression ratio. For an acoustic signature, a sampling period of 4 seconds may be used to capture the signature, which may be, for example, the name of the transaction executioner 34. The resulting file size for a 4 second sampling period is 64 kilobytes of information. Using an 8:1 compression ratio, the resulting file size is 8 kilobytes. The sampling rate may be reduced to obtain 8 kilobytes of information per second of recorded sound. With such a sampling rate, the resulting file size after 8:1 compression would be 4 kilobytes of information per signature. A reduced the sampling period of 2 seconds could be utilized to obtain a file size of 2 kilobytes. Reduction of the sampling period and thus memory storage requirements may be reduced through the use of a voice activated circuitry to initiate the audio capture process. Where the sampling process is activated manually as through actuator 28 (FIG. 1), a sampling period that is longer than necessary may be provided, and any non-relevant portion of the sampling period may be later truncated. By non-relevant portion of the sampling period is meant any period or periods of relative silence, e.g., periods during which the transaction executioner was not speaking (e.g., a pause at the beginning or extra unused sampling time). Truncation is advantageous since it would be unlikely that the sampling period will be needed. Truncation may be performed automatically through software, or manually through software responding to operator input. Truncation may be performed at the analog signal input stage through the use of voice activation circuitry.

Figure 3:
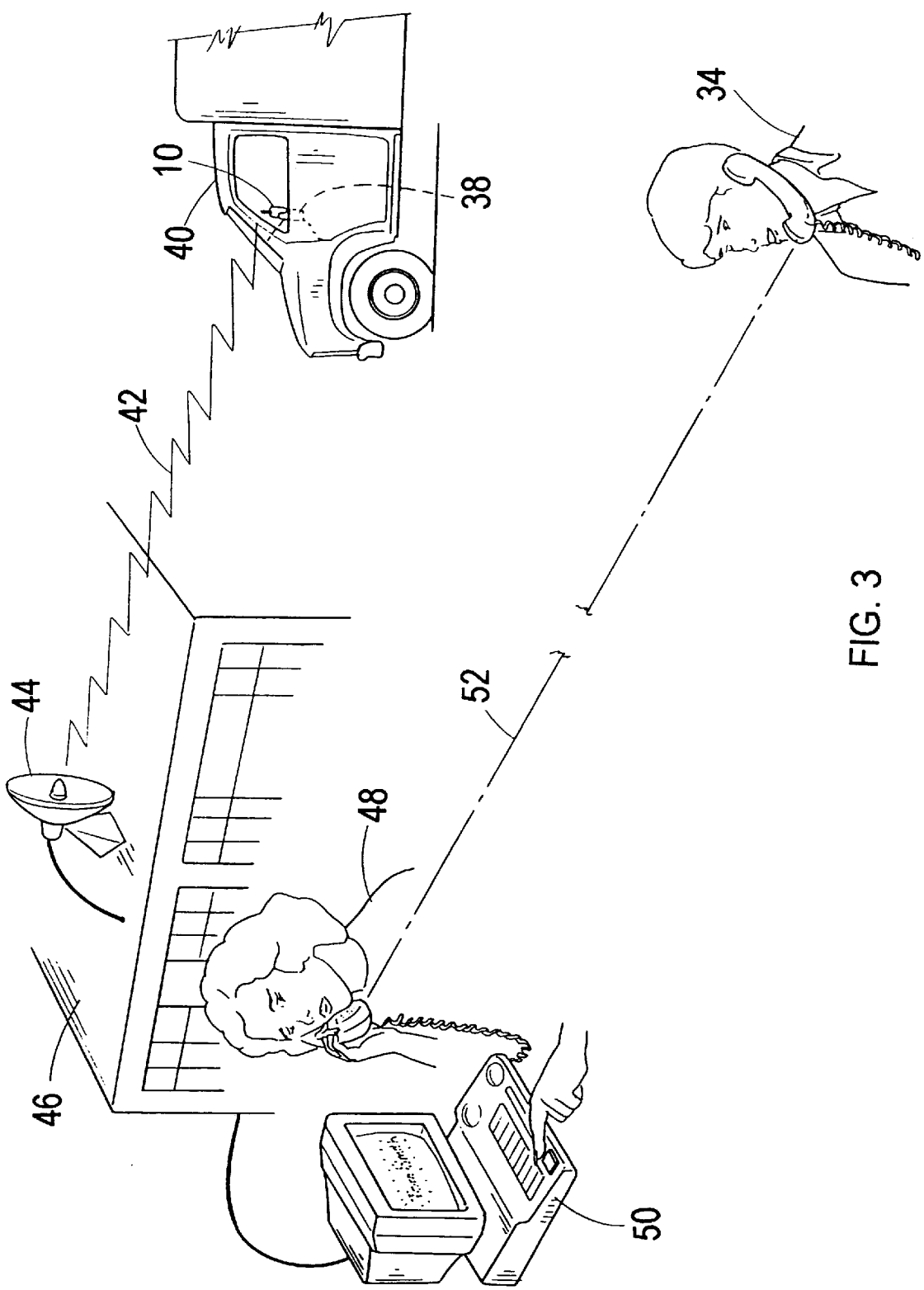
FIG. 3 illustrates the verification system of the present invention.

Referring now to FIG. 3, a somewhat schematic illustration of the transaction verification process is shown. The data terminal 10 may be inserted into a docking unit 38 mounted in a route delivery vehicle 40 driven by the route delivery driver 32 of FIG. 2. A radio-frequency communications link 42 may be utilized to transmit the digital signature file from the data terminal 10 to the a communications dish antenna 44 at a central location 46 for storage. The radio frequency communications link may be incorporated within a local area network (LAN) or wide area network (WAN), or may be implemented over a cellular telephone network, for example. When verification of the execution of the transaction is required, the interested party 34 may call an operator 48 located at the central location 46. The operator 48 may retrieve the digital signature file with the computer terminal 50. If the signature of the transaction executioner were an electronically digitized handwritten signature, the interested party 34 would be unable to verify over the telephone the identity of the transaction executioner. However, since the digital signature file represents the acoustic signature of the transaction executioner, the transaction may be verified by the operator 48 who may playback an audio reproduction of the acoustic signature which may be immediately transmitted over standard telephone lines 52 to the interested party. The interested party 34 may then instantaneously verify the identity of the transaction executioner upon hearing the acoustic signature.

Figure 4:
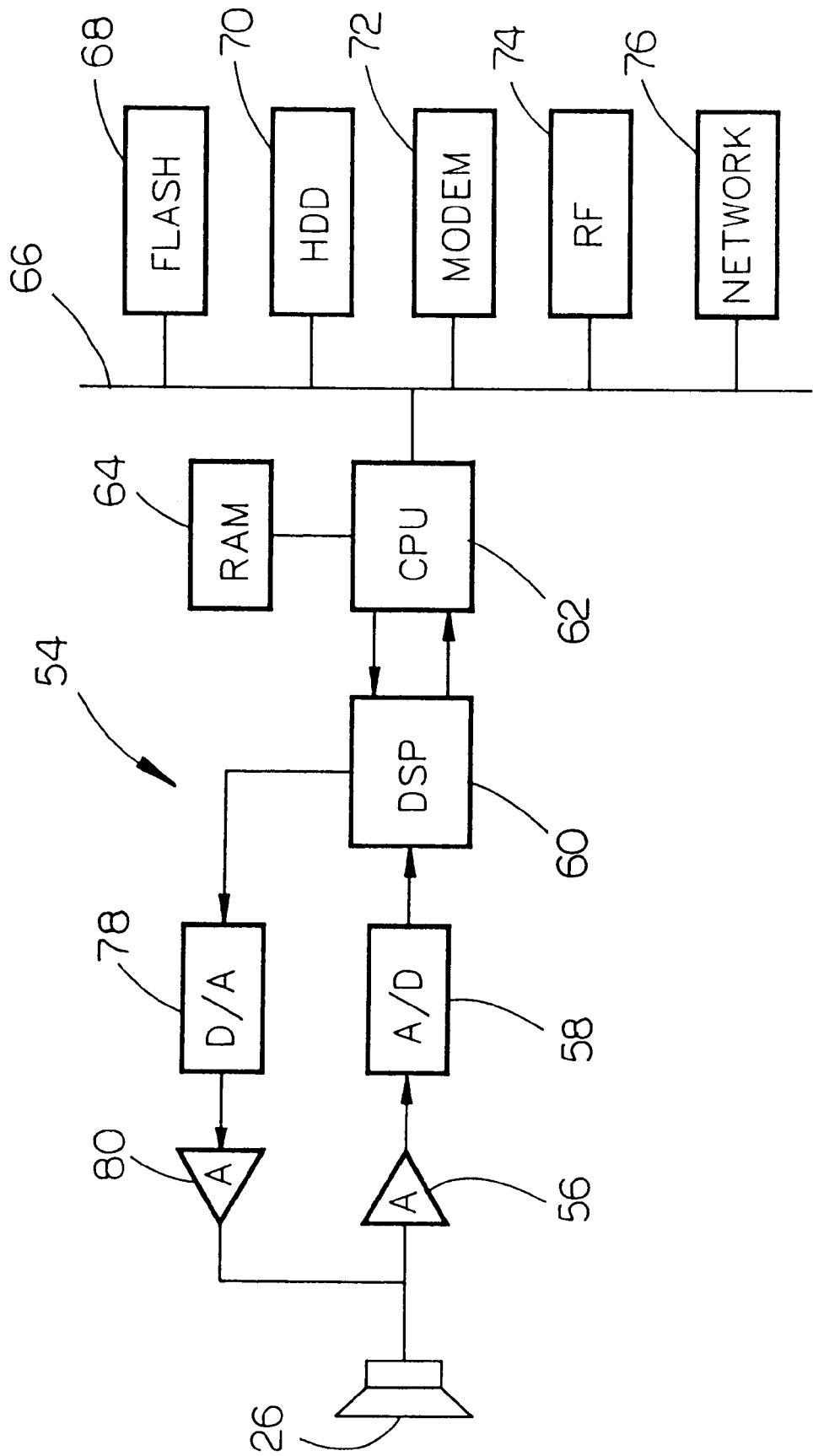
FIG. 4 is a schematic diagram of the architecture of the present invention.

FIG. 4 is a schematic diagram of the architecture of the present invention. An electroacoustic transducer 26 may be utilized to capture the acoustic signature of the executioner of the transaction. The acoustic signature is converted into an electrical signal which is amplified by an amplifier 56 as shown. The amplifier circuit 56 may also include other signal analog signal processing circuitry, for example a filter, for performing desired analog signal processing means. For example, the amplifier 56 may incorporate an anti-aliasing filter to remove undesired higher frequency signals which may interfere with subsequent digital processing of the signal. Other analog signal processing circuitry which may be incorporated includes, for example, auto-leveling circuitry which amplifies very low amplitude signals to an appropriate level for the analog to digital converter being utilized, and which reduces a loud signal which would otherwise exceed the sound input capability of the analog to digital converter being used in order to thereby avoid clipping distortion. The output of the amplifier feeds the signal into an analog-to-digital converter 58 for converting the signal into a digital signal. The output of the analog-to-digital converter 58 may then be fed into a digital signal processor 60 which performs computationally intensive processing of the digital signal. The output of the digital signal processor 60 then feeds into the central processing unit 62 of the data terminal where the signal may be further processed and stored in non-volatile memory such as FLASH memory 68 or hard disk drive media 70, for example via data bus 66. The central processing unit 62 may also utilize volatile RAM 64. The acoustic signature is thereby captured and converted into a digital signature file.

The digital signature file may be transferred to a remote location by various methods. For example, the digital signature file may be communicated by modem 72 to a remote central computer using standard telephone transmission lines. Alternatively, the digital signature file may be transmitted via a radio-frequency link 74 to a computer located at a remote location. Alternatively, the digital signature file may be transmitted over a local area network or a wide area network by utilizing a network interface device 76.

For verifying that the acoustic signature was successfully captured, the digital signal processor 60 may provide an output to a digital-to-analog converter 78 for converting the digital signature file into an analog signal. The analog signal may then be fed into an amplifier 80 which drives the electroacoustic transducer 26 as a speaker to reproduce the acoustic signature. If capture of the acoustic signature is determined be unsuccessful, the acoustic signature can be recaptured. The acoustic signature may be recaptured as many times as necessary until verified as successfully captured.

Figure 7:
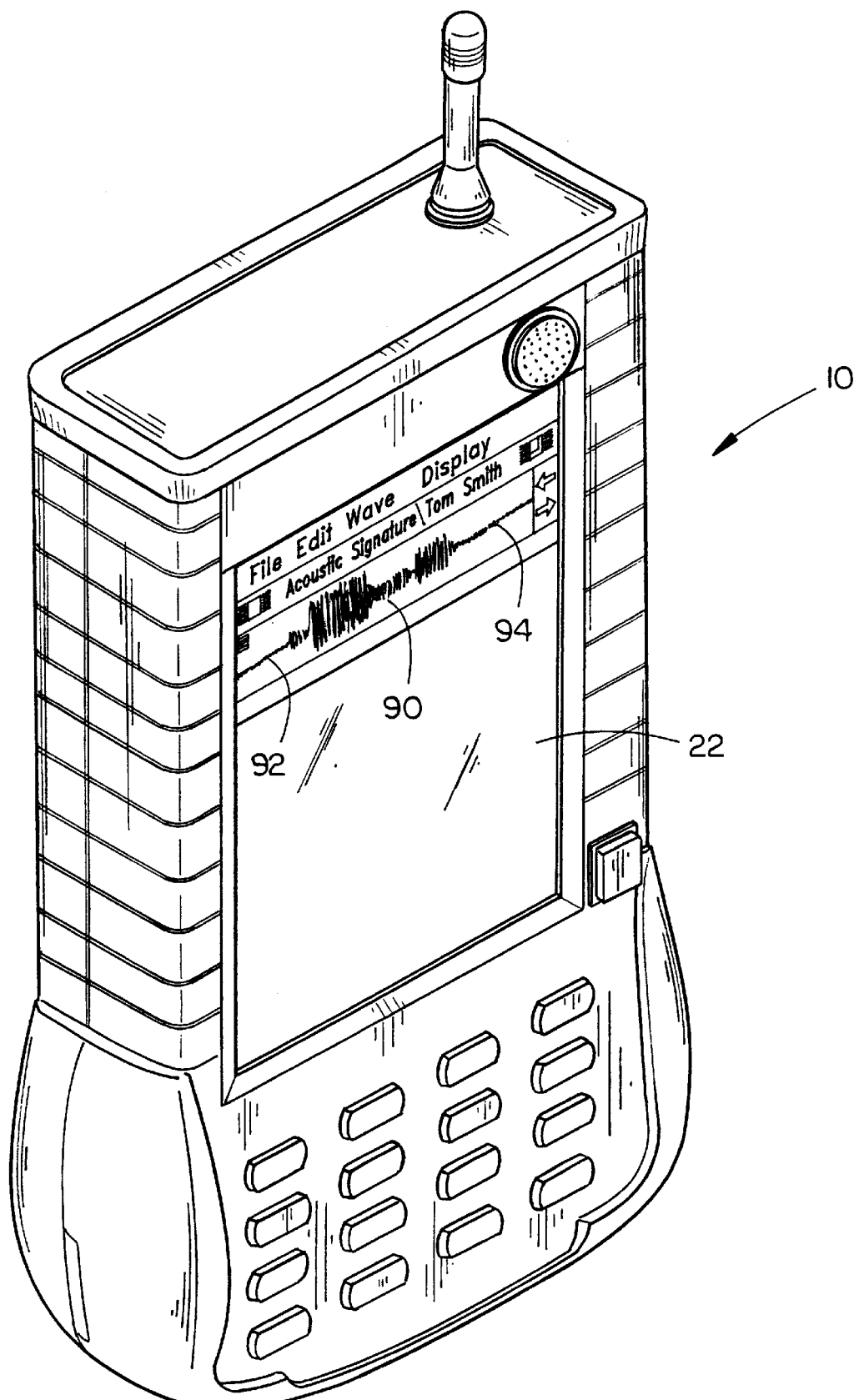
FIG. 7 shows a data terminal graphically displaying the sampled waveform of an acoustic signature, which may be used for acoustic signature verification or waveform file editing.

FIG. 7 shows a data terminal with a graphical display of an acoustic signature. A graphical display provides an alternative method of verifying the success of an acoustic signature capture. Verification of a successful acoustic signature capture may be performed using software to graphically display the digitized waveform 90 on display 22. A graphical display allows verification by visual inspection of the waveform 90, for example, by an agent 32 who is hearing impaired. Also, the graphical display of the digitized sound could be used for sound file editing. For example, an agent 32 could use touch screen input to quickly select the portions of the sampling period which are relevant (i.e., that portion of the sampling period during which the person was speaking) and which are extraneous (i.e., the portion or portions of the sampling period during which the person was no speaking) based on visualization of the waveform.

For example, the relatively flat (low amplitude) regions 92 and 94 of waveform 90 represent time periods within the sampling period during which the transaction executioner was not speaking. As such, these periods, or substantial portions thereof, could be deleted while preserving the relevant portion of the waveform 90, thus reducing the file size. Editing could be performed either by selecting the relevant portion for retention, or by selecting the irrelevant portion for deletion, preferably by touching or sliding a stylus or one's finger over the portion desired to be selected. Preferably, the software would differentially display or mark, e.g., as with highlighting, the area or areas selected for deletion and the area or areas selected for retention prior to deletion, and optionally prompt the operator for confirmation prior to making any changes. In addition or as an alternative to the confirmation prompt, the software may advantageously retain the complete waveform or recent changes to the waveform in volatile or non-volatile memory, at least temporarily, to provide an "undo" function in case an operator inadvertently deletes a relevant portion of the waveform 90.

Figure 5:
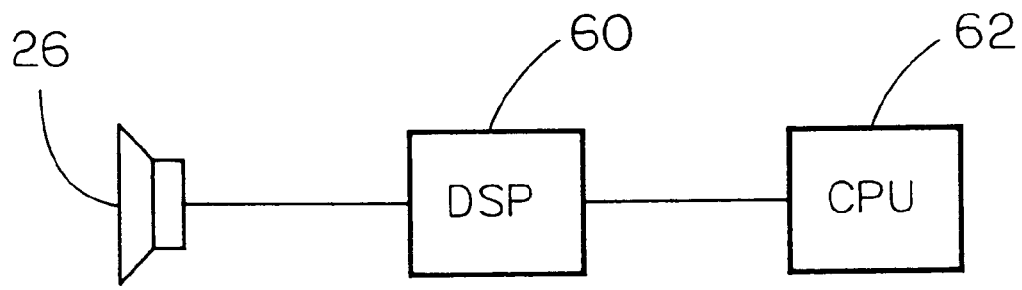
FIG. 5 is an illustration of the architecture of FIG. 4, showing a digital signal processor utilized which incorporates essential DSP support functions on a single integrated circuit.

FIG. 5 is an illustration of the architecture of FIG. 4, showing a digital signal processor utilized which incorporates essential DSP support functions on a single integrated circuit. The DSP 60 may be selected to include the analog-to-digital and digital-to-analog converters of FIG. 5 on a single integrated circuit. Further, other subcircuits such as amplifiers and anti-aliasing filters may be included on the single integrated circuit of the digital signal processor.

Figure 6:
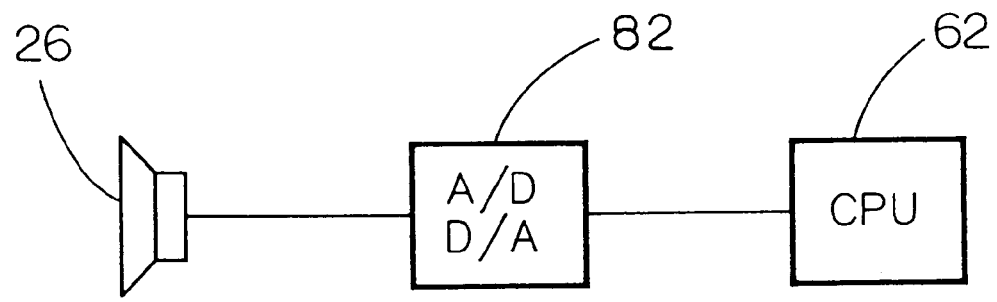
FIG. 6 is a schematic diagram of the architecture of FIG. 5 wherein the central processing unit may be utilized to perform the signal processing functions of the digital signal processor.

FIG. 6 is a schematic diagram of the architecture of FIG. 5 wherein the central processing unit 62 may be utilized to perform the signal processing functions of the digital signal processor 60. Any computer processor may be used for digital signal processing including microprocessors such as the Motorola 68000 or Intel i86 families. Typical computer processor devices do not have the architecture or on-chip facilities for efficient digital signal processing, lacking a hardware multiplier for example. Although real-time digital signal processing performance of standard computer processors does not compare well with even low power general-purpose digital signal processors, being typically 30 times slower, a general computer processor may be used for digital signal processing because of the relatively low amount of signal processing power that may still provide satisfactory results in capturing an acoustic signature. Thus, all that would be required would be an analog-to-digital signal converter and an digital-to-analog converter for providing an interface between the electroacoustic transducer and the central processing unit.

It is believed that the portable identification capture system for transaction verification of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for verifying the execution of a transaction, comprising:

capturing an acoustic signature of an executioner of the transaction concurrent with the execution thereof;

converting the acoustic signature into a digital signature file, said digital signature file comprising a digital audio format, said digital signature file being of a type suitable for digital processing and storage;

associating the digital signature file with the executed transaction; and transferring the digital signature file to a remote location for storage.

2. A method according to claim 1 further comprising the step of verifying the execution of the transaction by reproducing the acoustic signature of the executioner thereof from the digital signature file.

3. A method according to claim 2, further comprising the step of locally storing the digital signature file in a hand-held data collection terminal concurrent with the execution of the transaction.

4. A method according to claim 2, further comprising the step of verifying the capturing of the acoustic signature by reproducing the acoustic signature prior to the transferring of the digital signature file.

5. A method according to claim 2, further comprising the step of verifying the capturing of the acoustic signature by graphically displaying the acoustic signature prior to the transferring of the digital signature file.

6. A method according to claim 2, further comprising the step of truncating any non-relevant portions of the acoustic signature prior to transferring the digital signature file.

7. A method according to claim 4, further comprising the step of repeating said capturing step if said capture verification is unsuccessful.

8. A method according to claim 5, further comprising the step of repeating said capturing step until said capture verification is successful.

9. An apparatus for verifying the execution of a transaction, comprising:
- a hand-held portable data terminal for collecting and processing information relating to the transaction;
- an electroacoustic transducer disposed on said hand-held portable data terminal for converting an acoustic signal into an electrical signal;
- an analog to digital converter operably connected to said electroacoustic transducer for converting the electrical signal of said electroacoustic transducer into a digital signal; and
- a central processing unit, operably connected to said analog to digital converter, for processing digital signals.

10. An apparatus for verifying the execution of a transaction, comprising:
- a hand-held portable data terminal for collecting and processing information relating to the transaction;
- an electroacoustic transducer disposed on said hand-held portable data terminal for converting an acoustic signal into an electrical signal; and
- a digital signal processor operably connected to said electroacoustic transducer for converting the electrical signal of said electroacoustic transducer into a digital signal.

11. The apparatus according to claim 10 wherein said digital signal processor comprises dedicated hardware digital signal processing circuitry.

12. The apparatus according to claim 10 wherein said digital signal processor comprises digital signal processing software running on a general purpose computer processor.

13. The apparatus according to claim 10 further comprising an analog signal processor, said analog signal processor selected from the group consisting of an amplifier, an input sampling filter, signal level leveling circuitry, voice-activation circuitry, or any combination thereof.

14. A method for verifying the execution of a transaction, comprising the steps of:
- capturing an acoustic signature of an executioner of the transaction concurrent with the execution thereof;
- converting the acoustic signature into a digital signature;
- transferring the digital signature file to a remote location for storage; and
- reproducing the acoustic signature of the executioner thereof from the digital signature file to identify the executioner when requested.

15. A method for verifying the execution of a transaction, comprising the steps of:
- capturing a human recognizable characteristic of an executioner of the transaction concurrent with the execution thereof, such characteristic being recognizable by third parties acquainted with the executioner;
- converting the captured characteristic into a digital identification file;
- transferring the digital identification file to a remote location for storage; and
- reproducing the digital identification file and presenting the human recognizable characteristic therefrom to identify the executioner when requested to verify the execution of the past transaction as being by the executioner.

16. The method of claim 15, wherein the information in the digital identification file is transmitted via telephone as a voice signal for recognition by a human verifier acquainted with the executioner of the transaction, with the use of verifier's human sense of hearing.

17. A method for verifying the execution of a transaction, comprising:
- the step for capturing an acoustic signature of an executioner of the transaction concurrent with the execution thereof;
- the step for converting the acoustic signature into a digital signature;
- the step for transferring the digital signature file to a remote location for storage; and
- the step for reproducing the acoustic signature of the executioner thereof from the digital signature file to identify the executioner when requested.

18. A method for verifying the execution of a transaction, comprising:
- the step for capturing a human recognizable characteristic of an executioner of the transaction concurrent with the execution thereof, such characteristic being recognizable by third parties acquainted with the executioner;
- the step for converting the captured characteristic into a digital identification file;
- the step for transferring the digital identification file to a remote location for storage; and
- the step for reproducing the digital identification file and presenting the human recognizable characteristic therefrom to identify the executioner when requested to verify the execution of the past transaction as being by the executioner.

19. The method of claim 18, wherein the information in the digital identification file is transmitted via telephone as a voice signal for recognition by a human verifier acquainted with the executioner of the transaction, with the use of verifier's human sense of hearing.

* * * * *